US009104652B2

(12) United States Patent (10) Patent No.: US 9,104,652 B2
Ito (45) Date of Patent: Aug. 11, 2015

(54) DELETING A DOCUMENT FROM A DOCUMENT GROUP BASED ON TIME CONDITIONS

(71) Applicant: FUJI XEROX CO., LTD., Minato-ku, Tokyo (JP)

(72) Inventor: Yasuhiro Ito, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 396 days.

(21) Appl. No.: 13/761,802

(22) Filed: Feb. 7, 2013

(65) Prior Publication Data

US 2014/0068427 A1  Mar. 6, 2014

(30) Foreign Application Priority Data

Aug. 30, 2012  (JP) ................. 2012-189772

(51) Int. Cl.
  *G06F 17/24* (2006.01)
  *G06F 17/22* (2006.01)
  *G06F 17/30* (2006.01)

(52) U.S. Cl.
  CPC ............ *G06F 17/24* (2013.01); *G06F 17/2288* (2013.01); *G06F 17/241* (2013.01); *G06F 17/30011* (2013.01)

(58) Field of Classification Search
  CPC .................................................. G06F 1/22887
  See application file for complete search history.

(56) References Cited

U.S. PATENT DOCUMENTS

2006/0224626 A1\* 10/2006 Lakshminath et al. .... 707/104.1
2009/0303535 A1  12/2009 Ogura et al.
2012/0109915 A1\*  5/2012 Kamekawa .................... 707/695
2014/0095456 A1\*  4/2014 Pidduck ......................... 707/695

FOREIGN PATENT DOCUMENTS

| JP | 10240752 A | 11/1998 |
|---|---|---|
| JP | 11-085262 A | 3/1999 |
| JP | 2002024208 A | 1/2002 |
| JP | 2002328819 A | 11/2002 |
| JP | 2003-085015 A | 3/2003 |
| JP | 2004-348685 A | 12/2004 |
| JP | 2006069093 A | 3/2006 |
| JP | 2009-087318 A | 4/2009 |
| JP | 2009295165 A | 12/2009 |
| JP | 2010262502 A | 11/2010 |

OTHER PUBLICATIONS

English Translation of Japanese Office Action issued Jan. 22, 2013 in corresponding Japanese Patent Application No. 2012-189772.

\* cited by examiner

*Primary Examiner* — Scott Baderman
*Assistant Examiner* — Asher Kells
(74) *Attorney, Agent, or Firm* — Sughrue Mion, PLLC

(57) ABSTRACT

A document management apparatus includes a generating unit, a setting unit, a determining unit, and a deleting unit. The generating unit generates a new document from a base document. The setting unit sets the new document as a document which belongs to a document group to which the base document belongs. The determining unit determines whether or not a document group to which a selected document belongs includes a document which was generated or last viewed less than a reference time period ago. The deleting unit deletes the selected document if the document group does not include a document which was generated or last viewed less than the reference time period ago, and does not delete the selected document if the document group includes a document which was generated or last viewed less than the reference time period ago.

5 Claims, 5 Drawing Sheets

FIG. 5

| GROUP ID | MEMBER ID | · · · |
|---|---|---|
| G01 | G01-1, G01-2 | · · · |

FIG. 6

| MEMBER ID | G01-1 |
|---|---|
| FILE NAME | xxx.xdw |
| COORDINATES | (X1, Y1) |
| DATE AND TIME OF GENERATION | 01/01/2012/10:00 |
| BASE | NONE |
| · · · | · · · |

FIG. 7

| MEMBER ID | G01-2 |
|---|---|
| FILE NAME | YYY.xdw |
| COORDINATES | (X2, Y2) |
| DATE AND TIME OF GENERATION | 07/20/2012/10:00 |
| BASE | G01-1 |
| · · · | · · · |

# DELETING A DOCUMENT FROM A DOCUMENT GROUP BASED ON TIME CONDITIONS

CROSS-REFERENCE TO RELATED APPLICATIONS

This application is based on and claims priority under 35 USC 119 from Japanese Patent Application No. 2012-189772 filed Aug. 30, 2012.

BACKGROUND

1. Technical Field

The present invention relates to a document management apparatus, a document management method, and a non-transitory computer readable medium.

2. Summary

According to an aspect of the invention, there is provided a document management apparatus including a generating unit, a setting unit, a determining unit, and a deleting unit. The generating unit generates a new document from a base document. The setting unit sets the new document as a document which belongs to a document group to which the base document belongs, performs, if the base document does not belong to any document group, setting for creating a document group to which the base document and the new document belong, and performs, if the base document belongs to a certain document group, setting for adding the new document to the certain document group. The determining unit determines, if a document which belongs to a document group created by the setting unit is selected, whether or not the document group to which the selected document belongs includes a document which was generated or last viewed less than a reference time period ago. The deleting unit deletes the selected document if the document group to which the selected document belongs does not include a document which was generated or last viewed less than the reference time period ago, and does not delete the selected document if the document group to which the selected document belongs includes a document which was generated or last viewed less than the reference time period ago.

BRIEF DESCRIPTION OF THE DRAWINGS

An exemplary embodiment of the present invention will be described in detail based on the following figures, wherein:

FIG. 5 is a diagram illustrating group data;

FIG. 6 is a diagram illustrating attribute data;

FIG. 7 is a diagram illustrating attribute data; and

DETAILED DESCRIPTION

Hereinafter, an exemplary embodiment of the present invention will be described in detail with reference to the drawings.

Figure 1:
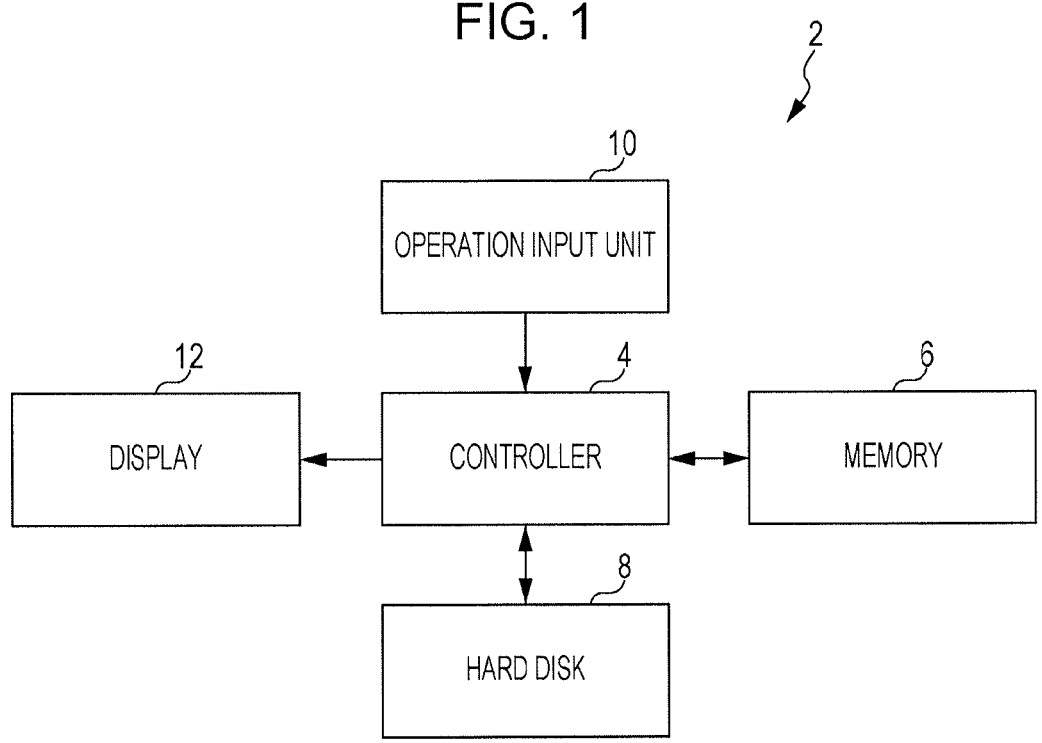
FIG. 1 is a diagram illustrating the configuration of a document management apparatus.

FIG. 1 is a diagram illustrating the configuration of a document management apparatus 2 according to the exemplary embodiment. The document management apparatus 2 is a computer, such as a personal computer, and includes a controller 4, as illustrated in FIG. 1. The controller 4 is a microprocessor, and executes processing in accordance with a document management application program stored in a memory 6. Also, the document management apparatus 2 includes the memory 6. The memory 6 includes a random access memory (RAM) and a read only memory (ROM), and stores various pieces of data. Specifically, as described above, the memory 6 stores the document management application program. The document management application program may be read out from a computer-readable information storage medium (for example, DVD (registered trademark)-ROM) and stored in the memory 6, or may be downloaded via a network and stored in the memory 6.

Also, the document management apparatus 2 includes a hard disk 8. The hard disk 8 stores various pieces of information. In the exemplary embodiment, the hard disk 8 stores plural documents. Each document is document data or image data which is generated in accordance with the document management application program.

Also, the document management apparatus 2 includes an operation input unit 10. The operation input unit 10 corresponds to a mouse, a keyboard, and the like, and outputs an operation signal which represents an operation performed by a user to the controller 4. Also, the document management apparatus 2 includes a display 12. The display 12 is, for example, a liquid crystal display, and displays information in response to an instruction from the controller 4.

In the document management apparatus 2, a workspace screen is displayed on the display 12 while the document management application program is active. A document is displayed on the workspace screen, and a user manages the document by using the workspace screen as a user interface. For example, the user creates a new document from an existing document by performing a certain operation. For example, the user creates, from an existing document, a new document from which noise has been removed. Also, for example, the user creates a new document by converting the resolution of an existing document.

Figure 2:
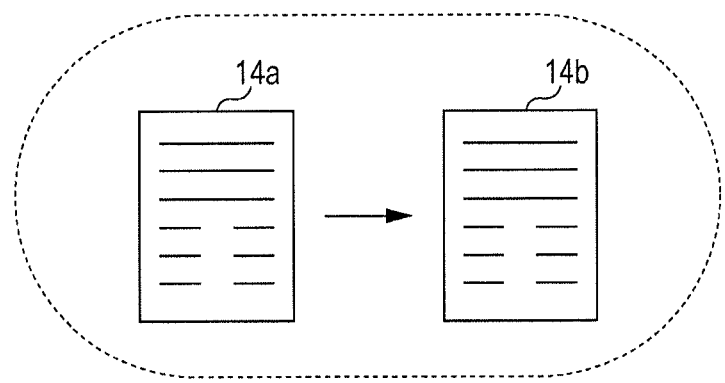
FIG. 2 is a diagram illustrating a state where a new document is generated from an existing document.

In the document management apparatus 2, when a new document is generated from an existing document, both of the documents are grouped together. For example, as illustrated in FIG. 2 which illustrates a state where a new document 14b is generated from an existing document 14a, when the new document 14b is generated from the existing document 14a, the existing document 14a as a base and the new document 14b are grouped together as documents which belong to the same document group.

Figure 3:
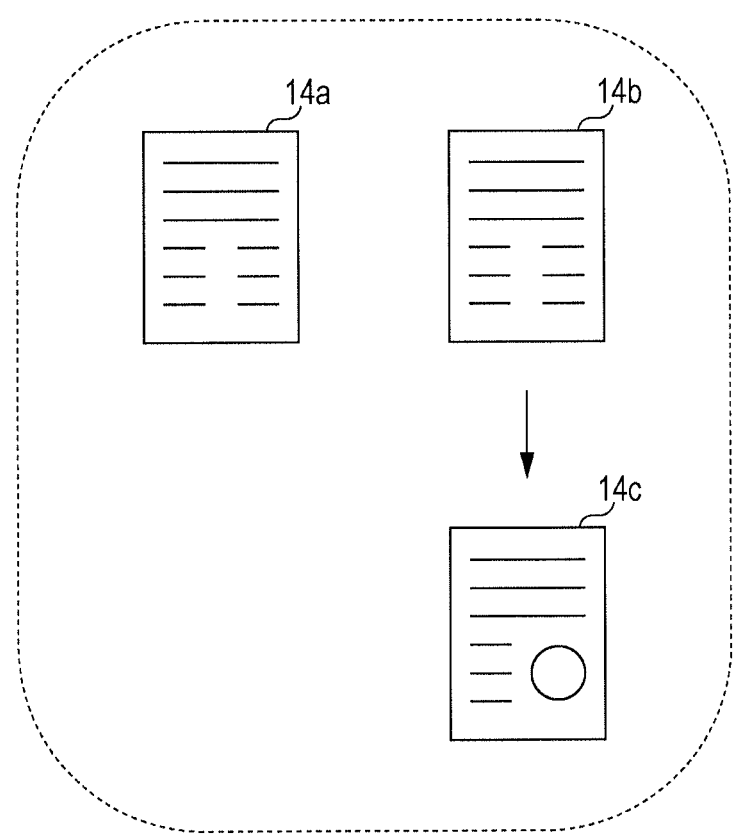
FIG. 3 is a diagram illustrating a state where a new document is generated from an existing document.

Additionally, in the document management apparatus 2, when a new document 14c is generated from any one of the documents 14a and 14b which are grouped together, the new document 14c is added to the document group to which the documents 14a and 14b belong, as illustrated in FIG. 3. That is, in the document management apparatus 2, when a new document is generated from an existing document, both of the documents are set as documents which belong to the same document group. Thus, in the document management apparatus 2, one document 14a and plural documents 14b and 14c derived from the document 14a are grouped together. In other words, documents related to the document 14a are grouped together. Accordingly, for example, plural documents related to a project are grouped into one group.

An effect of grouping documents derived from one document will be described below.

Figure 4:
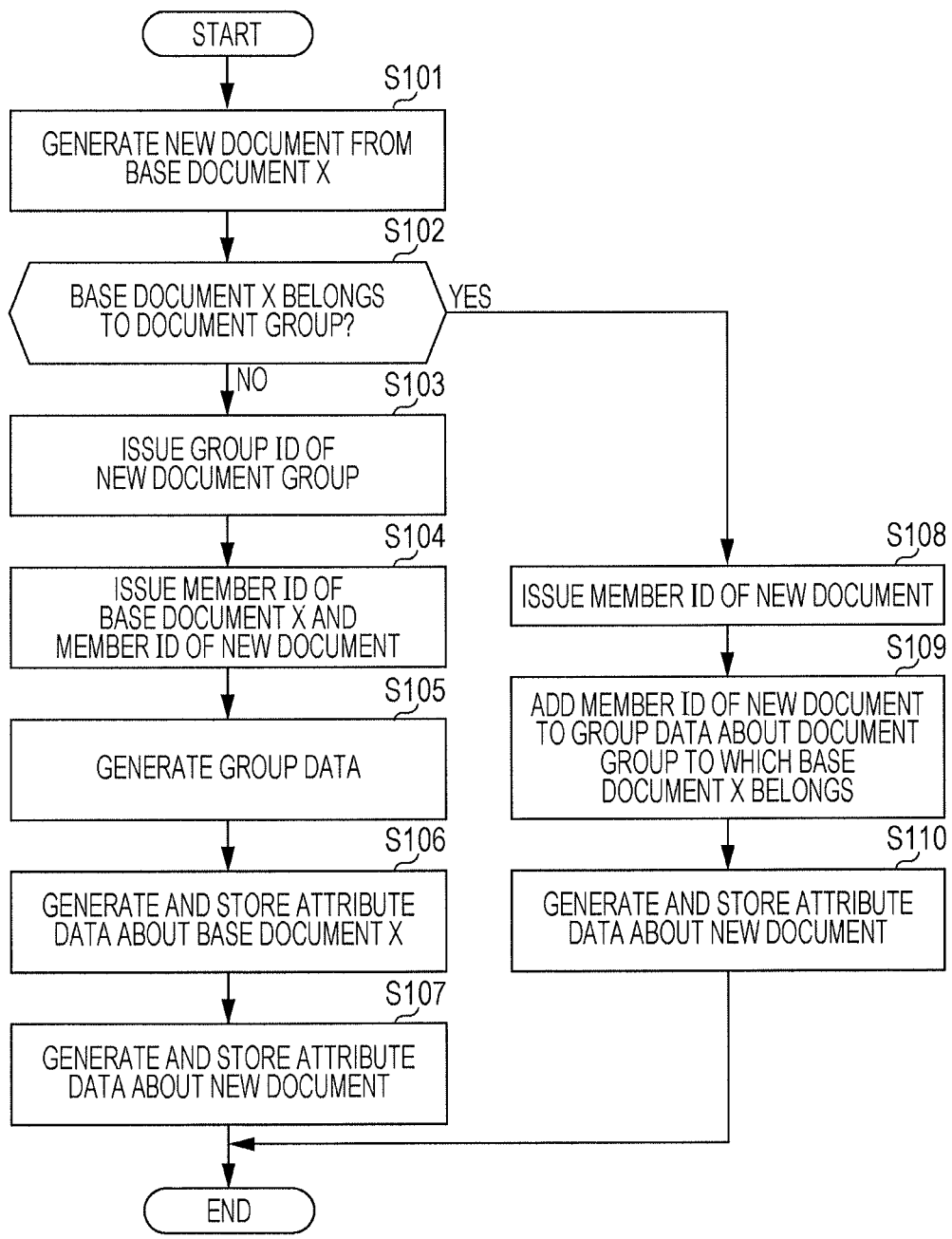
FIG. 4 is a flowchart illustrating a process executed by a controller.

Next, a process for grouping documents derived from one document will be described with reference to FIG. 4. In the exemplary embodiment, this process is executed by the controller 4 in a case where a new document is generated from an existing document.

In step S101, the controller 4 (generating unit) generates a new document from a document (hereinafter referred to as a base document X), and stores the new document in the hard disk 8. For example, the controller 4 generates, from the base document X, a new document from which noise has been removed. Alternatively, for example, the controller 4 generates a new document by converting the resolution of the base document X. In step S101, the base document X is not updated, but is maintained.

The above-described noise removal and resolution conversion are merely examples, and a process of generating a new document is not limited thereto.

In step S102, the controller 4 determines whether or not the base document X belongs to any document group. In the exemplary embodiment, attribute data (described below) about a document which belongs to a document group is stored in the hard disk 8. The controller 4 determines whether or not the attribute data about the base document X is stored in the hard disk 8.

If the base document X does not belong to any document group (NO in step S102), the controller 4 executes steps S103 to S107, and thereby generates a new document group to which the base document X and the new document belong. That is, in step S103, the controller 4 (setting unit) issues a group ID, which is identification information about a new document group. In step S104, the controller 4 (setting unit) issues a member ID of the base document X and a member ID of the new document in accordance with the group ID of the new document group.

Subsequently, the controller 4 allows the base document X and the new document to belong to the new document group by executing a model data creation process constituted by steps S104 to S107. That is, in step S105, the controller 4 generates group data including the group ID of the new document group and the member IDs of both documents, and stores the group data in the hard disk 8. FIG. 5 illustrates the group data. As illustrated in FIG. 5, a member ID includes a group ID. Thus, a document group is identified on the basis of a member ID.

In step S106, the controller 4 generates attribute data about the base document X, and stores the attribute data in the hard disk 8. FIG. 6 illustrates the attribute data about the base document X. Attribute data is data indicating attributes of a document, and includes a member ID of the document, a file name of the document, coordinates indicating the display position of the document, date and time when the document was generated, and a member ID of a base document of the document. The attribute data may also include information indicating a process with which the document has been generated. Here, the base document X does not belong to any document group, and thus the base of the base document X is "none". This means that the base document X is an original document.

In step S107, the controller 4 generates attribute data about the new document, and stores the attribute data in the hard disk 8. FIG. 7 illustrates the attribute data about the new document.

If the base document X belongs to any document group (YES in step S102), the controller 4 adds the new document to the document group to which the base document X belongs. That is, in step S108, in accordance with the member ID of the base document X, the controller 4 specifies the group ID of the document group to which the base document X belongs, and issues a member ID of the new document in accordance with the specified group ID. In step S109, the controller 4 adds the member ID of the new document to the group data about the document group to which the base document X belongs, that is, to the group data including the member ID of the base document X. In step S110, as in step S107, the controller 4 generates attribute data about the new document and stores the attribute data in the hard disk 8.

In this way, the controller 4 groups one document, that is, documents derived from an original document together.

It is considered that a document which was generated at the start of a project, that is, an old document which was generated a long time ago, is referred to less frequently, and the necessity of storing such an old document in the hard disk 8 is small. However, if the project is progressing though a long time has elapsed since the project started, the document which was generated at the start of the project may be used in the future, though the possibility is low. That is, even an old document may be used in the future if a document derived from the old document has been generated recently. Thus, the document management apparatus 2 is configured so that a document which may be used in the future is not deleted carelessly. Hereinafter, this will be described.

Figure 8:
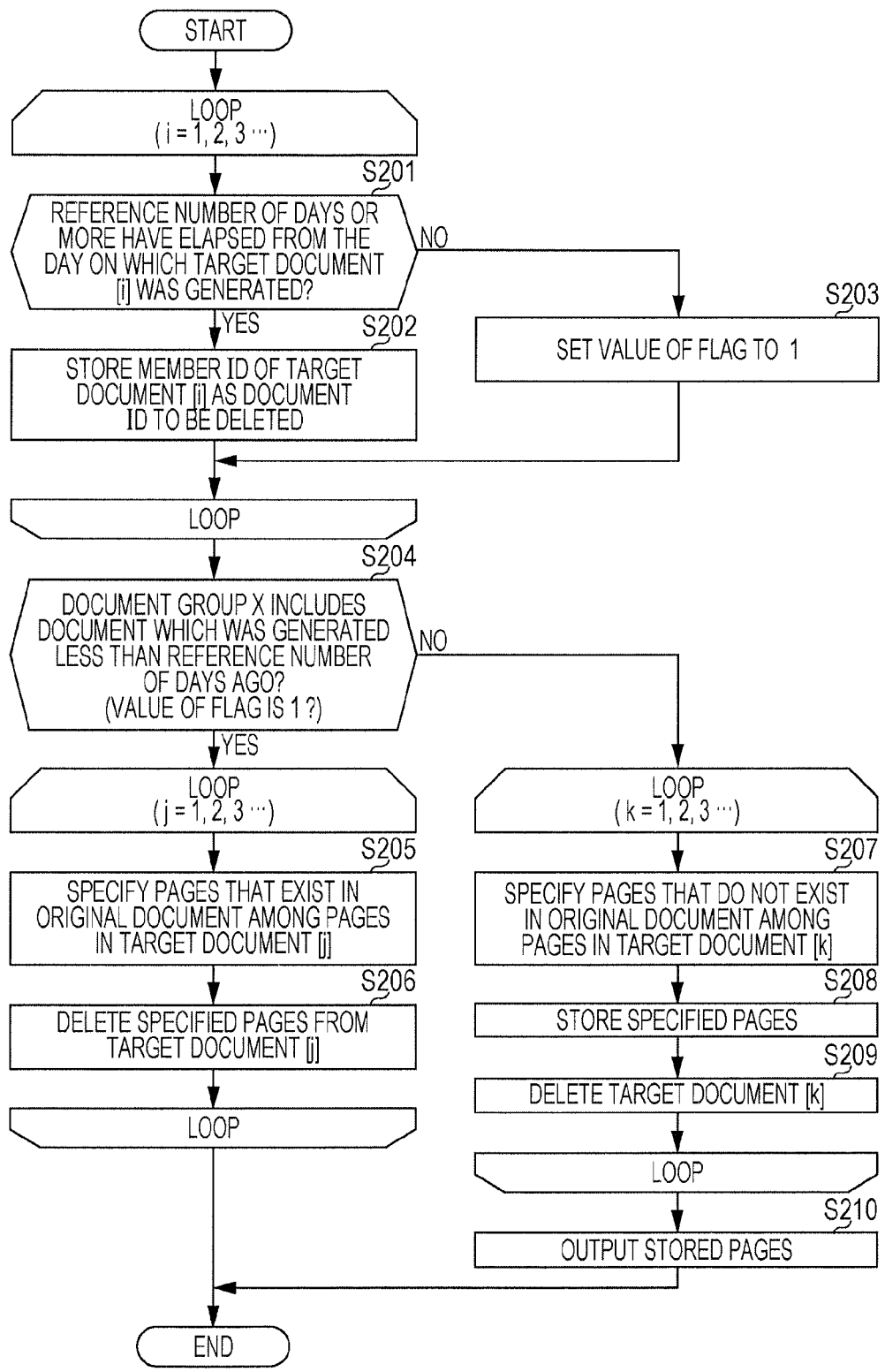
FIG. 8 is a flowchart illustrating a process executed by the controller.

FIG. 8 is a flowchart illustrating a process executed by the controller 4. In the exemplary embodiment, this process is executed at certain timing for each document group which is generated in the process illustrated in FIG. 4. Hereinafter, the process illustrated in FIG. 8 will be described, with a target document group to be processed being regarded as a document group X.

First, the controller 4 sequentially selects all or some of the documents in the document group X one by one as a target document [i], and executes steps S201 to S203 every time the controller 4 selects the target document [i]. Specifically, in step S201, the controller 4 determines, in accordance with the attribute data about the target document [i], whether or not a reference number of days or more have elapsed from the day on which the target document [i] was generated. If the reference number of days or more have elapsed from the day on which the target document [i] was generated (YES in step S201), the controller 4 stores the member ID of the target document [i] in the memory 6 as a candidate ID to be deleted. If the reference number of days or more have not elapsed from the day on which the target document [i] was generated (NO in step S201), the controller 4 sets the value of a flag stored in the memory 6 to "1".

The initial value of the flag is "0". If the flag has a value of "1", it indicates that the document group X includes a document which was generated less than the reference number of days ago, that is, a relatively new document which is inferred to be used frequently.

In step S204, the controller 4 (determining unit) determines whether or not the document group X includes a document which was generated less than the reference number of days ago. That is, the controller 4 determines whether or not the value of the above-described flag is "1".

If the document group X includes a document which was generated less than the reference number of days ago (YES in step S204), the controller 4 sequentially selects the documents indicated by the candidate IDs to be deleted which are stored in the memory 6 one by one as a target document [j], and executes steps S205 and S206 every time the controller 4 selects the target document [j]. Specifically, in step S205, the controller 4 (specifying unit) compares an original document in the document group X with the target document [j], and specifies one or more pages that exist in the original document among the pages in the target document [j]. That is, the controller 4 specifies one or more pages that do not include a portion changed from the original document among the pages in the target document [j]. In step S206, the controller 4 (deleting unit) deletes the page or pages specified in step S205 from the target document [j].

If the document group X does not include a document which was generated less than the reference number of days ago (NO in step S204), the controller 4 sequentially selects the documents indicated by the candidate IDs to be deleted which are stored in the memory 6 one by one as a target document [k], and executes steps S207 to S209 every time the controller 4 selects the target document [k]. That is, in step S207, the controller 4 (specifying unit) compares the original document in the document group X with the target document [k], and specifies one or more pages that do not exist in the original document among the pages in the target document [k]. That is, the controller 4 specifies one or more pages that include a portion changed from the original document among the pages in the target document [k]. In step S208, the controller 4 stores the specified page or pages in the memory 6. In step S209, the controller 4 (deleting unit) deletes the target document [k]. Also, the controller 4 deletes the attribute data about the target document [k] and the member ID of the target document [k] from the group data about the document group X.

In step S210, the controller 4 outputs the pages which are stored in the memory 6 in step S208. In the exemplary embodiment, the controller 4 generates a document in which the pages stored in the memory 6 are bound, and displays the generated document.

As described above, in the document management apparatus 2, deletion of a document in a document group is limited if the document group includes a relatively new document, and deletion of a document in a document group is not limited if the document group does not include a relatively new document. This suppresses careless deletion of a document which may be used in the future. Depending on the setting performed in advance by a user, steps S207, S208, and S210 may be omitted.

The embodiment of the present invention is not limited to the above-described exemplary embodiment.

For example, instead of the date and time when a document was generated, the date and time when a document was last viewed (hereinafter referred to as date and time of view) may be included in attribute data. In this case, the controller 4 may determine in step S201 in FIG. 8 whether or not a reference number of days or more have elapsed from the day on which the target document [i] was last viewed, in accordance with the date and time of view included in the attribute data about the target document [i].

A new document generated by the controller 4 may be a document which is generated by adding so-called annotation data to a base document, not a document which is generated through noise removal processing or resolution processing. That is, an exemplary embodiment of the present invention is applicable to a case where the new document generated in step S101 is a document which is generated by adding annotation data to a base document. Here, annotation data is data representing display elements, such as a line segment, a translucent marker, text, and a sticky note. Annotation data added to a document is displayed such that the display element represented by the annotation data is superimposed on the content of the document when the document is displayed. In this case, steps S207, S208, and S210 may be executed. Depending on the setting performed in advance by a user, the following steps may be executed instead of these steps. That is, instead of steps S207 and S208, a step of extracting annotation data added to a target document [k] and storing the extracted annotation data in the memory 6 may be executed. Also, instead of step S210, a step of adding the annotation data stored in the memory 6 to another document (for example, original document) may be executed.

Also, for example, a document selected by a user may be selected as the target document [i].

Also, for example, the controller 4 may omit step S203, and may determine in step S204 whether or not a document group X includes a document in a certain state (for example, active state). In this case, if the document group X includes a document in the certain state, the controller 4 may execute step S205 and the subsequent steps. If the document group X does not include a document in the certain state, the controller 4 may execute step S207 and the subsequent steps.

Also, for example, the controller 4 may delete a document which is selected by a user as a target to be deleted in a document group. Note that, if the document selected by the user as a target to be deleted is an original document, the controller 4 may present a screen for confirming the intention to delete the document to the user and also may present the other documents which belong to the same document group to the user.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document management apparatus comprising:
 a generating unit that generates a new document from a base document;
 a setting unit that sets the new document as a document which belongs to a document group to which the base document belongs, that performs, if the base document does not belong to any document group, setting for creating a document group to which the base document and the new document belong, and that performs, if the base document belongs to a certain document group, setting for adding the new document to the certain document group;
 a determining unit that determines, if a document which belongs to a document group created by the setting unit is selected, whether or not the document group to which the selected document belongs includes a document which was generated or last viewed less than a reference time period ago; and
 a deleting unit that deletes the selected document if the document group to which the selected document belongs does not include a document which was generated or last viewed less than the reference time period ago, and that does not delete the selected document if the document group to which the selected document belongs includes a document which was generated or last viewed less than the reference time period ago.

2. The document management apparatus according to claim 1, further comprising:

a specifying unit that specifies a portion of the selected document, the portion being included in an original document which is a document in the document group to which the selected document belongs and which is a document generated before the selected document, wherein the deleting unit deletes the specified portion from the selected document if the document group to which the selected document belongs includes a document which was generated or last viewed less than the reference time period ago.

3. The document management apparatus according to claim 1, further comprising:

a specifying unit that specifies a portion of the selected document, the portion not being included in an original document which is a document in the document group to which the selected document belongs and which is a document generated before the selected document; and a generating unit that generates a document which includes the specified portion if the document group to which the selected document belongs does not include a document which was generated or last viewed less than the reference time period ago.

4. A document management method comprising:

generating a new document from a base document;

setting the new document as a document which belongs to a document group to which the base document belongs, performing, if the base document does not belong to any document group, setting for creating a document group to which the base document and the new document belong, and performing, if the base document belongs to a certain document group, setting for adding the new document to the certain document group;

determining, if a document which belongs to a document group created by the setting is selected, whether or not the document group to which the selected document belongs includes a document which was generated or last viewed less than a reference time period ago; and deleting the selected document if the document group to which the selected document belongs does not include a document which was generated or last viewed less than the reference time period ago, and not deleting the selected document if the document group to which the selected document belongs includes a document which was generated or last viewed less than the reference time period ago.

5. A non-transitory computer readable medium storing a program causing a computer to execute a process, the process comprising:

generating a new document from a base document;

setting the new document as a document which belongs to a document group to which the base document belongs, performing, if the base document does not belong to any document group, setting for creating a document group to which the base document and the new document belong, and performing, if the base document belongs to a certain document group, setting for adding the new document to the certain document group;

determining, if a document which belongs to a document group created by the setting is selected, whether or not the document group to which the selected document belongs includes a document which was generated or last viewed less than a reference time period ago; and deleting the selected document if the document group to which the selected document belongs does not include a document which was generated or last viewed less than the reference time period ago, and not deleting the selected document if the document group to which the selected document belongs includes a document which was generated or last viewed less than the reference time period ago.

* * * * *